United States Patent [19]

Paton

[11] Patent Number: 4,817,928

[45] Date of Patent: Apr. 4, 1989

[54] SUSPENSION SYSTEM

[76] Inventor: H. Neil Paton, 1460 Elliott Ave. West, Seattle, Wash. 98119

[21] Appl. No.: 106,459

[22] Filed: Oct. 9, 1987

[51] Int. Cl.⁴ .................. B60G 13/00; B60G 15/00; F16F 7/00; F16F 9/00
[52] U.S. Cl. .................................... 267/219; 267/33; 267/34; 267/35; 267/64.15; 267/220; 267/221; 280/668
[58] Field of Search ............... 267/219, 220, 33–35, 267/64.15, 217, 221, 292–294, 121, 152; 280/668, 710, 708, 709, 711, 712, 716; 188/321.11, 129; 213/43, 44; 384/615, 609, 611

[56] References Cited

U.S. PATENT DOCUMENTS

| | | |
|---|---|---|
| 1,936,389 | 11/1933 | Halquist . |
| 2,005,089 | 6/1935 | Krebs . |
| 2,230,069 | 1/1941 | Rushmore . |
| 2,605,099 | 7/1952 | Brown . |
| 2,822,165 | 2/1958 | Boschi . |
| 2,833,535 | 5/1958 | Blythe ............... 267/219 |
| 2,925,263 | 2/1960 | Blythe ............... 267/219 |
| 2,981,534 | 4/1961 | Peras ............... 267/220 |
| 3,037,764 | 6/1962 | Paulsen . |
| 3,118,659 | 1/1964 | Paulsen . |
| 3,279,779 | 10/1966 | Thomas et al. . |
| 3,447,814 | 6/1969 | Siber et al. . |
| 3,729,101 | 4/1973 | Brambilla et al. ............... 267/35 X |
| 4,260,177 | 4/1981 | Pflughaupt et al. ............... 267/33 X |
| 4,434,977 | 3/1984 | Chiba et al. ............... 267/33 |
| 4,462,608 | 7/1984 | Lederman ............... 267/220 X |
| 4,592,540 | 6/1986 | Yokoya et al. ............... 267/35 X |
| 4,613,114 | 9/1986 | Paton ............... 267/33 X |
| 4,618,130 | 10/1986 | Veglia ............... 280/668 X |
| 4,673,192 | 6/1987 | Krehan et al. ............... 280/668 |
| 4,690,425 | 9/1987 | Kubo et al. ............... 280/668 |
| 4,699,530 | 10/1987 | Satoh et al. ............... 280/668 X |
| 4,738,437 | 4/1988 | Paton et al. ............... 188/129 X |

FOREIGN PATENT DOCUMENTS

| | | |
|---|---|---|
| 160851 | 4/1954 | Australia . |
| 45497 | 2/1982 | European Pat. Off. . |
| 0225271 | 6/1987 | European Pat. Off. ............... 267/35 |
| 662622 | 7/1938 | Fed. Rep. of Germany . |
| 1064825 | 9/1959 | Fed. Rep. of Germany ...... 267/219 |
| 2305725 | 8/1973 | Fed. Rep. of Germany ........ 267/35 |
| 3542942 | 6/1986 | Fed. Rep. of Germany ........ 267/35 |
| 1440023 | 8/1966 | France . |
| 52-24676 | 2/1977 | Japan . |
| 0033008 | 2/1982 | Japan ............... 267/33 |
| 58-118344 | 7/1983 | Japan . |
| 755186 | 8/1956 | United Kingdom . |
| 755808 | 8/1956 | United Kingdom . |
| 885925 | 1/1962 | United Kingdom ............... 267/33 |
| 0895798 | 5/1962 | United Kingdom ............... 267/219 |
| 1437525 | 5/1976 | United Kingdom . |

OTHER PUBLICATIONS

Rowland, "Suspension Simplicity from Paton," Automotive News, Jul. 28, 1986, at 32.

The Paton Corp., "The Electronic Suspension Revolution and the Paton Dry-Namic TM (Non-Hydraulic) Suspensions," Jun. 1986.

Gieck et al., "The 'Marsh Mellow' Spring," SAE Technical Paper 820,161, Feb. 22, 1982.

Moulton et al., "Rubber Springs for Vehicle Suspension," published by the Institute of Mechanical Engineering, 1956.

*Primary Examiner*—Douglas C. Butler
*Attorney, Agent, or Firm*—Finnegan, Henderson, Farabow, Garrett & Dunner

[57] ABSTRACT

The system includes a hydraulically damped strut and a tubular elastomeric spring. The ends of the spring may be sealed so that the spring can be pressurized internally. An improved bearing, which permits rotative shifting of the spring and strut in response to turning effort, also is disclosed. The suspension is particularly useful in applications which heretofore involved MacPherson struts.

7 Claims, 3 Drawing Sheets

SUSPENSION SYSTEM

BACKGROUND OF THE INVENTION

This invention relates to suspension systems and, more particularly, to suspension systems which include suspension struts.

In the typical MacPherson strut commonly found on many passenger vehicles, a hydraulically damped strut and a coil spring respectively provide damping and load bearing support for the vehicle. As a front-end suspension, an endless bearing acts between the top mount and the upper end of the spring to permit rotative movement between the cylinder and the piston rod of the strut in response to turning effort applied to the cylinder via the bottom mount during turns. Due to this location of the bearing, however, rotative shifting of the cylinder is subject to a mechanical disadvantage related to the diameter differential between the bearing and the cylinder. Turning effort required to rotate the cylinder with respect to the spring and piston rod during turns therefore must be sufficient to overcome this mechanical disadvantage. Even more turning effort is needed if the frictional resistance to such rotation is increased on account of the presence of dirt or other material at the rotational interfaces between the cylinder and piston rod. As more and more rotational effort is thus required, of course, the ride and handling properties of the suspension become less and less predictable, or even unsatisfactory.

Tubular elastomeric springs have certain advantages, in some suspension applications, over coil springs. It accordingly is desirable in such applications to substitute tubular elastomeric springs for coil springs. In the case of the strut suspensions of the type just described, however, this is not always practical. The spring seats commonly used to support coil springs generally are of an irregular configuration which conforms to the contours of the end coils of the springs involved. Unlike coil springs, tubular elastomeric springs operate more effectively when supported between continuous annular spring seats, especially if it is desired to establish a seal at the ends of the spring for purposes of dirt prevention and/or internal pressurization. In addition, the endless bearings commonly used with most top mounts to permit relative rotative movement between the cylinder and piston rod often provide unsatisfactory protection against the entrance of contaminants and moisture.

SUMMARY OF THE INVENTION

One object of this invention is to provide a suspension system which includes a hydraulically damped strut and a tubular elastomeric spring instead of a coil spring.

Another object of this invention is to provide a suspension system which includes a hydraulically damped strut and a tubular elastomeric spring, the ends of which may be sealed and the interior of which may be pressurized.

Another object of this invention is to provide a suspension system which includes a hydraulically damped strut and a spring, whether a coil spring or a tubular elastomeric spring, in which the spring and piston rod are rotatable conjointly with respect to the cylinder at essentially a 1:1 mechanical advantage.

Still another object of this invention related to that just stated is to provide a continuous seal with respect to the cylinder despite such rotative movement.

These objects are accomplished in accordance with the principles of the present invention by providing a suspension system which comprises a hydraulically damped strut having a cylinder and reciprocative piston rod projecting from the inner end of the cylinder. An upper spring seat is supported by the piston rod and forms a first annular seating surface which extends around the piston rod. A lower spring seat is supported by the cylinder adjacent its inner end and forms a second annular seating surface which extends around the cylinder. The first annular seating surface and the second annular seating surface are spaced apart from and are opposed to one another, preferably in a parallel relation. A tubular elastomeric spring acts between these seating surfaces and is so positioned that it extends around portions of the piston rod and the cylinder. With this construction, therefore, the spring is compressible between the seating surfaces in response to extension and contraction of the piston rod, preferably in a generally axial direction. The axis of the spring, however, need not coincide with the longitudinal axis of the strut, especially in those applications in which it is necessary to cant the spring in order to satisfy a particular suspension geometry requirement.

According to further principles of this invention, the first and second seating surfaces are continuous, and hence engage the ends of the spring, preferably in face-to-face relation, so that air tight seals are formed between them. To facilitate the formation of these seals, the ends of the spring are or may be grooved so as to form suction seals when pressed against a flat surface. Consequently, the ends of the spring may be closed and sealed so that the interior of the spring may be pressurized. Even if left unpressurized, moreover, the spring still acts as a dust boot, keeping dirt and/or contaminants away from the sliding surfaces of the cylinder and piston.

According to still further principles of this invention, a bearing acts between the lower spring seat and the cylinder for permitting rotative shifting between them. While preferably this bearing is made up of a sleeve bearing which bears down upon a thrust bearing secured to and projecting from the cylinder, conventional roller or ball bearings supported in a suitable race may be provided. Regardless of which type of bearing is used, it can be constructed of a diameter which corresponds to the diameter of the cylinder. Consequently, unlike conventional suspension systems of the type described above, the cylinder may be rotated with respect to the spring and piston rod at essentially a 1:1 mechanical advantage in response to turning effort applied to the cylinder. It will be recognized that the advantages of this aspect of the present invention are attainable with tubular elastomeric springs, coil springs and the like.

These and other features, objects and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
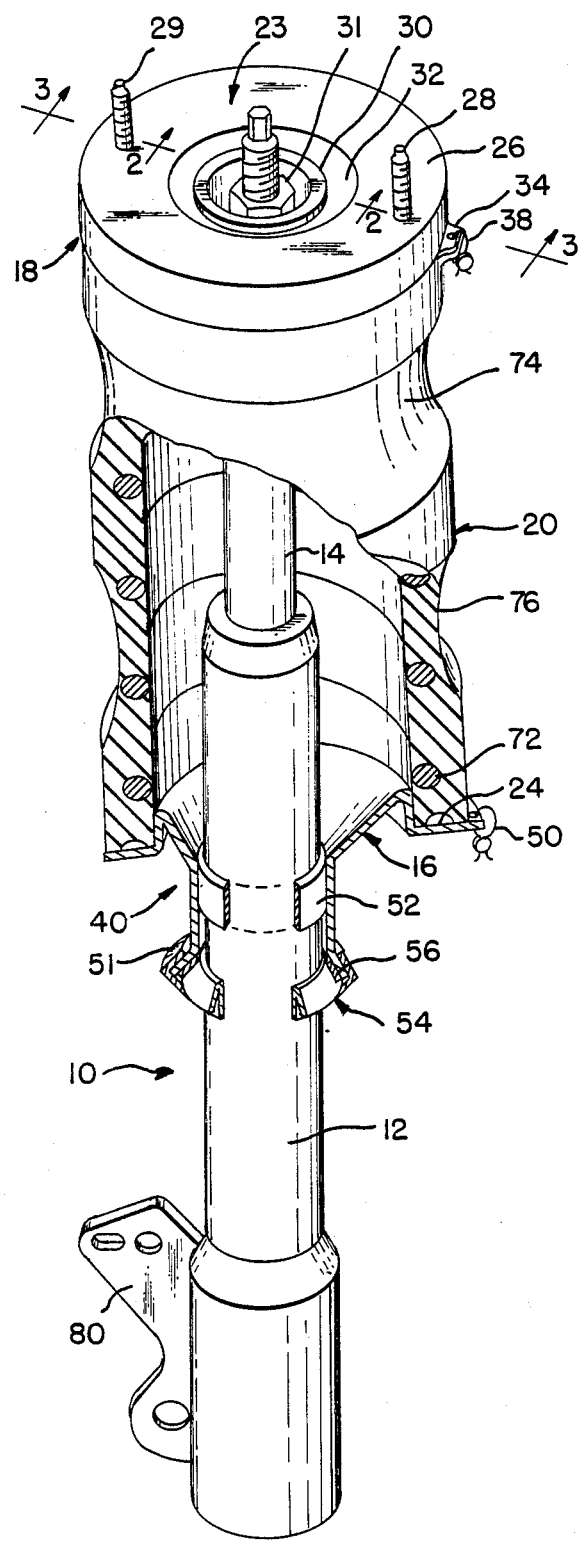
FIG. 1 is a perspective of one presently preferred embodiment of the present invention, with parts broken away.
Figure 3:
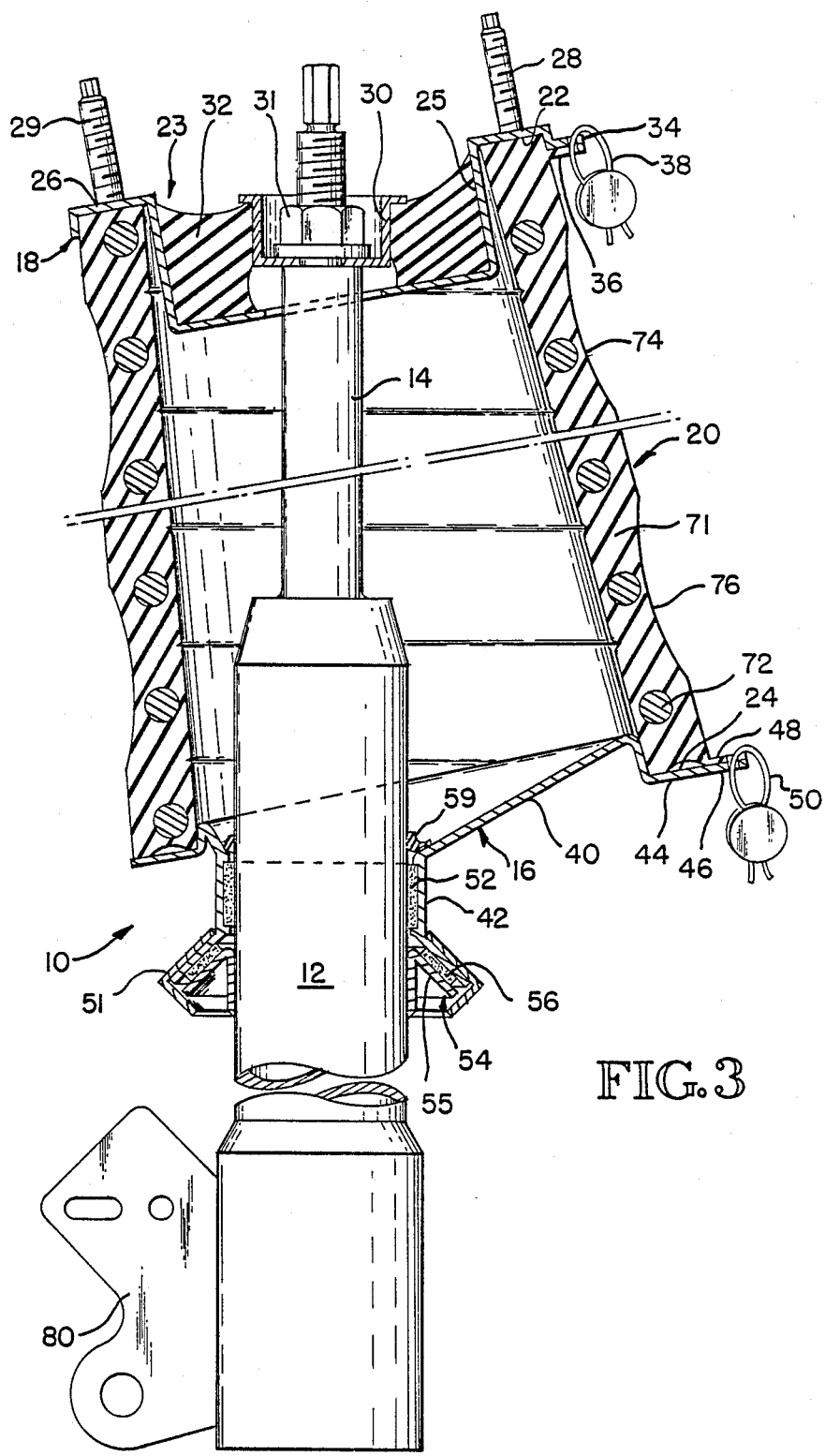
FIG. 3 is a section taken along line 3—3 in FIG. 1, depicting the strut in side elevation.

Referring to FIGS. 1 and 3, one presently preferred embodiment of the present invention comprises a hydraulically damped strut (generally referenced by numeral 10) which is made up of a cylinder 12 and a reciprocative piston rod 14. Cylinder 12 and piston rod 14 respectively support a lower spring seat 16 and an upper spring seat 18, between which a reinforced tubular elastomeric spring 20 is compressed. The upper spring seat 18 forms an upper continuous annular seating surface 22 which extends around the upper end of piston rod 14. The lower spring seat forms a lower continuous annular seating surface 24 which extends around cylinder 12. As will be apparent, surfaces 22 and 24 are spaced apart from, and are opposed to, one another, preferably in parallel relationship substantially transverse to the longitudinal axis of spring 20. In the example, these surfaces are inclined with respect to the longitudinal axis of strut 10, corresponding to the canted orientation of spring 20.

Referring now to FIG. 3, a top mount assembly (generally referenced by numeral 23) includes spring seat 18. In the example illustrated, spring seat 18 has an inner cylindrical body portion 25 and an outer lip portion 26 of inverted L-shaped cross section. In the example, the lower face of portion 26 forms surface 22. It is flat and is of sufficient width to form a face-to-face contact seal with the upper end of spring 20, as will be described presently. The opposite face of portion 26 bears against and is secured by threaded connectors 28 and 29 to a vehicle body (not shown). Top mount 23 further includes an inner cup-shaped member 30 which is located inside of portion 25 and is secured to the outer end of the piston rod 14 by a bolt 31. As bolt 31 is screwed onto an outer threaded end portion of piston rod 14, it tightens down upon and secures member 30 to piston rod 14. A mass of suitable elastomer 32 is bonded to and connects portion 25 and member 30, and thus provides supplemental damping, in addition to that provided by strut 10 and spring 20. Still referring to FIGS. 1 and 3, a tab 34 may be formed on the outer edge of the portion 26. When aligned with a correspondingly shaped tab 36 on spring 20, the spring may be located in a prescribed rotative alignment. In addition, by passing a lock wire 38 through aligned holes in tabs 34 and 36, it is possible to provide anti-tampering protection (as reflected by the condition of wire 38).

Still referring to FIG. 3, spring seat 16 includes a generally conical body portion 40, an inner sleeve portion 42, and an outer lip portion 44 of L-shaped cross section. In the example, the upper face of portion 44 forms surface 24. Like portion 26, it is flat and is of sufficient width to form a face-to-face contact seal with the lower end of spring 20, simultaneously with and in the same manner as that formed at surface 22, as will be described presently. A tab 46 generally similar to tab 36 projects outwardly from portion 44, and is alignable with a tab 48 on spring 20 to provide alignment and anti-tampering protection, corresponding to that provided by tabs 34 and 36, when fitted with a lock wire 50 which extends through aligned holes in tabs 46 and 48. To provide additional anti-tampering protection against the possibility that the spring and top mount could be removed as a unit leaving wires 38 and 50 intact, a break-off tab 51 projects from portion 42 and overlaps portion 54, as shown (FIGS. 1 and 3).

Still referring to FIG. 3, a cylindrical sleeve bearing 52 is interposed between portion 42 and the outer surface of cylinder 12. This bearing is composed of a suitable low friction material, and is freely slidable both rotatively and longitudinally with respect to cylinder 12. A thrust bearing assembly 54, however, prevents longitudinal movement of portion 42, and hence of seat 16, and therefore permits only rotative shifting of them with respect to cylinder 12. Assembly 54 is made up of an annular member 55 of an inverted V-shaped cross section. Member 55 is secured to and projects outwardly from cylinder 12, with its outer leg inclined downwardly with respect to the longitudinal axis of the strut, as shown (FIG. 3). Portion 42 includes a correspondingly inclined section which bears down upon and is supported by member 55. A conical sleeve bearing 56 composed of suitable low friction material is interposed between member 55 and the inclined section of portion 42, so as to permit rotative shifting of them. It will be recognized that other kinds of bearings could be used in place of bearings 52 and 56. A sealing ring 59 is located adjacent the common edge of portions 40 and 42. Ring 59 provides an air tight seal between cylinder 12 and seat 16, while permitting cylinder 12 to shift rotatively with respect to seat 16.

Figure 2:
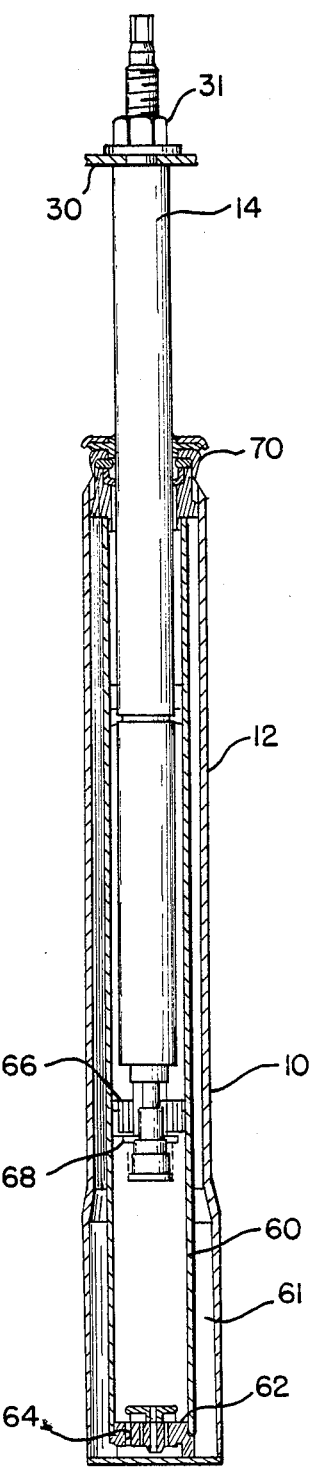
FIG. 2 is a section taken along the line 2—2 in FIG. 1.

Referring to FIG. 2, strut 20 includes an inner cylinder 60, which is located coaxially within cylinder 12, and thus forms an annular space 61 between them. Piston 14 is movable reciprocatingly with cylinder 60. Two oppositely acting valve assemblies 62 and 64 are located adjacent the outer end of cylinder 60, and include metering orifices which control the flow of hydraulic fluid between the inside of cylinder 60 and space 61. Two oppositely acting valve assemblies 66 and 68 are located adjacent the inner end of piston 14, and, like assemblies 62 and 64, control the flow of hydraulic fluid across piston 14. High pressure gas may be injected into space 61 above the hydraulic fluid, to help the flow of fluid through the valves during rebound and to prevent cavitation. A seal assembly 70 provides a fluid and gas seal between piston 14 and cylinders 12 and 60. Damping is created by a combination of the piston rod bushing and seal friction, and the shear friction of the hydraulic fluid as it moves through assemblies 62, 64, 66, and 68. These and other details of strut 20 are well known, and therefore are omitted for sake of brevity. One commercially available component suitable for use as strut 20 is Motorcraft Part No. E53C18045AA, which is manufactured by or for Ford Motor Company.

Referring again to FIGS. 1 and 3, spring 20 includes a tubular elastomeric body 71, which, in the example illustrated, is reinforced by an embedded coil spring 72. The ends of the body are grooved, so that they form respective suction seals when pressed against surfaces 22 and 24. Spring 20 is made by the process of forming a first portion of the spring with a generally cylindrical inner bore and a generally straight sided outer profile. One or more additional portions of the spring, however, are contoured as at 74 and 76, so as to bulge outwardly to a greater extent than the outer surface of noncontoured portion, causing breakover of its force vs. deflection curve from constant rate to variable rate, at a predetermined load. This bulging differential is the result of a bulging instability which occurs in each of the contoured portions.

During extension and contraction of strut 10, spring 20 is compressed between seats 16 and 18. Since the upper and lower ends of spring 20 are sealed at surfaces 22 and 24, however, it also is possible to pressurize the interior of spring 20 so as to allow the spring to provide height control or other supplemental spring effects, as the case may be. The internal pressure may be provided and maintained by external devices not shown, or by use of the air trapped inside spring 20 when it is first mounted upon and sealed between seats 16 and 18. In addition, when used as a front-end suspension, bearing 52 allows cylinder 12 to shift rotatively with respect to piston rod 14 and spring 20 in response to turning effort applied to cylinder 12 via a bottom mount 80. Unlike conventional MacPherson struts, however, cylinder 12 is so movable through an essentially 1:1 mechanical advantage because bearing 52 has a diameter corresponding to that of cylinder 12.

Figure 4:
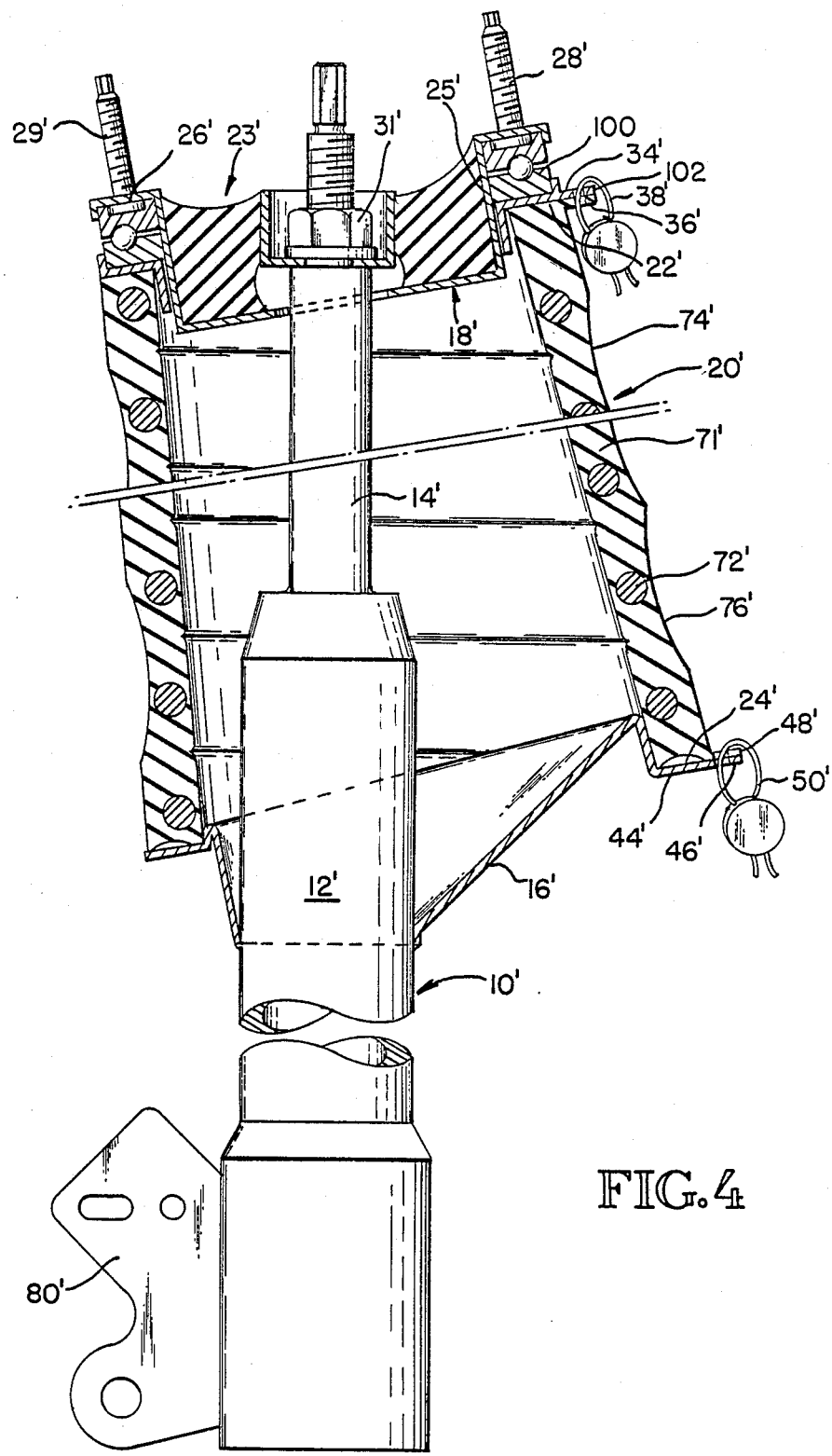
FIG. 4 is longitudinal section of another presently preferred embodiment of the present invention.

Referring now to FIG. 4, a second presently preferred embodiment of the suspension system of this invention includes a hydraulically damped strut and a tubular elastomeric spring, both of which are generally similar to those just described with reference to FIGS. 1-3. Unlike the FIG. 1-3 suspension, however, the FIG. 4 suspension includes a conventional endless bearing acting between top mount assembly 23' and spring 20'. For sake of brevity, parts of the FIG. 4 suspension which correspond to those parts of the FIG. 1-3 suspension already described will not be described further, and are designated in FIG. 4 with the same reference numerals, primed.

Referring to FIG. 4, a circular ball bearing race 100 is interposed between portion 26' and the upper end of spring 20'. A ring 102 of L-shaped cross section is secured to the lower face of race 100, between it and spring 20', as shown (FIG. 4). It is ring 102 which forms surface 22'. Seat 16' is secured to and projects from cylinder 12', as shown (FIG. 4). Rotative movement of cylinder 12' with respect to piston rod 14' and spring 20' now occurs at race 100 and hence is subject to a mechanical advantage less than 1:1, as reflected by the diameter differential between cylinder 12' and race 100.

Although two presently preferred embodiments of this invention have been illustrated and described herein, variations will become apparent to one of ordinary skill in the art. Accordingly, the invention is not to be limited to the specific embodiments illustrated and described herein, and the true scope and spirit of the invention are to be determined by reference to the appended claims.

The embodiment of the invention in which an exclusive property of privilege is claimed are defined as follows:

1. A suspension, comprising: a damping assembly; first spring seat means operatively associated with said damping assembly forming a first seating surface which is continuous and extends around said damping assembly; second spring seat means operatively associated with said damping assembly forming a second seating surface which is continuous and extends around said damping assembly in an opposed parallel relationship with said first seating surface; a tubular, sealed elastomeric spring having two ends which are operatively associated with said first seating surface and said second seating surface to form two continuous seals therebetween, respectively; first anti-tampering means acting between said first spring seat means and one end of said spring; second anti-tampering means acting between said second spring seat means and the other end of said spring; bearing means acting between said second spring seat means and said cylinder, and including a load bearing member and a thrust bearing member; said load bearing member being movable with respect to said damping assembly and projecting away from said other end in an outward direction; said thrust bearing member being secured to and projecting outwardly from said damping assembly in parallel underlying relation with said load bearing member; and third anti-tampering means acting between said load bearing member and said thrust bearing member; said first anti-tampering means being breakable in response to tampering with the seal formed between said first seating surface and said one end; said second anti-tampering means being breakable in response to tampering with the seal formed between said second seating surface and said other end; and said third anti-tampering means being breakable in response to tampering with said spring and said first and second spring seat means.

2. The suspension of claim 1, wherein said one end includes a tab forming a first opening, said first spring seat means include means forming a second opening which is alignable with said first opening when said one end and said first seating surface form a seal therebetween, and said first anti-tampering means include a breakable member extending through said first and second openings.

3. The suspension of claim 1, wherein said other end includes a tab forming a first opening, said second spring seat means include means forming a second opening which is alignable with said first opening when said other end and said second seating surface form a seal therebetween, and said second anti-tampering means include a breakable member extending through said first and second openings.

4. The suspension of claim 1, wherein said third anti-tampering means include breakable tab means secured to one of said load bearing member and said thrust bearing member, and overlapping the other of said load member and said thrust bearing member.

5. A tamper-proof spring assembly for a suspension, said spring assembly comprising: first spring seat means forming a continuous first seating surface; second spring seat means forming a continuous second seating surface which is opposed and parallel to said first seating surface; a tubular sealed elastomeric spring having two ends which are operatively associated with said first seating surface and second seating surface to form two continuous seals therebetween, respectively; first anti-tampering means acting between said first spring seat means and one end of said spring; and second anti-tampering means acting between said second spring seat means and the other end of the spring; said first anti-tampering means being breakable in response to tampering with the seal formed between said first seating surface and said one end; said second anti-tampering means being breakable in response to tampering with the seal formed between said second seating surface and said other end.

6. The assembly of claim 5, wherein said one end includes a tab forming a first opening, said first spring seat means include means forming a second opening which is alignable with said first opening when said one end and said first seating surface form a seal therebetween, and said first anti-tampering means include a breakable member extending through said first and second openings.

7. The assembly of claim 5, wherein said other end includes a tab forming a first opening, said second spring seat means include means forming a second opening which is alignable with said first opening when said other end and said second seating surface form a seal therebetween, and said second anti-tampering means include a breakable member extending through said first and second openings.

* * * * *